(12) United States Patent
Youk et al.

(10) Patent No.: US 9,074,072 B2
(45) Date of Patent: Jul. 7, 2015

(54) LARGE-SIZED VINYL CHLORIDE SEED, METHOD OF PREPARING THE SEED, VINYL CHLORIDE RESIN PREPARED USING THE SEED, AND METHOD OF PREPARING THE VINYL CHLORIDE RESIN

(71) Applicant: LG Chem, Ltd., Seoul (KR)

(72) Inventors: Kyung Seog Youk, Jeollanam-do (KR); Hyun Jin Shin, Seoul (KR); Han Hong Kim, Jeollanam-do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/447,894

(22) Filed: Jul. 31, 2014

(65) Prior Publication Data
US 2014/0342158 A1    Nov. 20, 2014

Related U.S. Application Data

(63) Continuation of application No. 12/481,823, filed on Jun. 10, 2009, now abandoned.

(30) Foreign Application Priority Data

Jun. 13, 2008 (KR) .................. 10-2008-0055486
Oct. 15, 2008 (KR) .................. 10-2008-0101315

(51) Int. Cl.
*C08F 2/22* (2006.01)
*C08F 114/06* (2006.01)
*C08K 5/42* (2006.01)

(52) U.S. Cl.
CPC ............. *C08K 5/42* (2013.01); *Y10T 428/2982* (2015.01); *C08F 2/22* (2013.01); *C08F 114/06* (2013.01)

(58) Field of Classification Search
CPC ............. C08F 114/06; C08F 2/22; C08K 5/42
USPC ................ 526/202, 344, 344.2; 524/745
See application file for complete search history.

(56) References Cited

U.S. PATENT DOCUMENTS

| 5,290,890 A | 3/1994 | Kim et al. |
| 6,245,848 B1 * | 6/2001 | Espiard et al. ............... 524/419 |
| 6,864,303 B2 * | 3/2005 | Lee et al. .................... 523/201 |
| 2006/0058478 A1 | 3/2006 | Gaschler |

FOREIGN PATENT DOCUMENTS

| CN | 87108041 A | 6/1988 |
| CN | 1165150 A | 11/1997 |
| CN | 101184476 A | 5/2008 |
| JP | 2007-217626 A | 8/2007 |
| KR | 101998019077 A | 6/1998 |
| KR | 10-0252532 B1 | 4/2000 |
| KR | 2008-0049974 A | 5/2008 |

* cited by examiner

*Primary Examiner* — Kelechi Egwim
(74) *Attorney, Agent, or Firm* — Lerner, David, Littenberg, Krumholz & Mentlik, LLP

(57) ABSTRACT

The present invention relates to a large-sized vinyl chloride seed with an average particle size of 0.65 to 1.5 μm, a vinyl chloride resin with improved low-viscosity properties, and preparation methods thereof. The preparation of the large-sized vinyl chloride seed includes adding a vinyl chloride monomer, an emulsifier, and a polymerization initiator to an aqueous medium; homogenizing the mixed solution using a rotor-stator type homogenizer; and subjecting the resultant monomer droplets to a polymerization reaction.

5 Claims, No Drawings

LARGE-SIZED VINYL CHLORIDE SEED, METHOD OF PREPARING THE SEED, VINYL CHLORIDE RESIN PREPARED USING THE SEED, AND METHOD OF PREPARING THE VINYL CHLORIDE RESIN

CROSS-REFERENCE TO RELATED PATENT APPLICATION

This application is a continuation of U.S. application Ser. No. 12/481,823, filed Jun. 10, 2009, which claims the benefit of Korean Patent Application Nos. 10-2008-0055486, filed on Jun. 13, 2008 and 10-2008-0101315, filed on Oct. 15, 2008 in the Korean Intellectual Property Office, the disclosures of which are incorporated herein by reference.

BACKGROUND OF THE INVENTION

1. Field of the Invention

The present invention relates to a large-sized vinyl chloride seed, a method of preparing the seed, and a vinyl chloride resin prepared using the seed. The vinyl chloride resin exhibits improved high-shear and low-shear viscosity properties through adjustment of the weight ratio of the large-sized vinyl chloride seed and a small-sized vinyl chloride seed with an average particle size of 0.08 to 0.2 μm.

2. Description of the Related Art

A paste vinyl chloride resin is a general-purpose resin that is widely used worldwide for domestic and industry applications, and is generally prepared by emulsion polymerization, micro-suspension polymerization, or seed emulsion polymerization.

In seed emulsion polymerization, seed particles with different particles sizes, generally two kinds of seed particles are used, and the viscosity and other properties of a final product are controlled by adjusting the ratio of the seed particles. In particular, the final particle size of a vinyl chloride resin wholly depends on the particle size of a large-sized seed and the amount of an initiator contained in the seed.

Conventionally, a vinyl chloride resin is prepared from a large-sized seed with a particle size of 0.5 to 0.54 μm and a small-sized seed with a particle size of 0.08 to 0.2 μm, and has an average particle size of about 0.8 to 1.3 μm. However, in case of using a large-sized seed with a particle size of 0.54 μm, it may be difficult to enlarge the particle size of a vinyl chloride resin to a level above a predetermined value. Further, the use of a large-sized seed with a larger average particle size may lead to increased production of abnormal polymer agglomerates (called "scales") which are not normal polymers. The scales may be recovered in a state of being mixed with a desired polymer product or being attached to an inner wall of a reactor. The scales should be filtered out since they cannot be used as normal products, and more scales may lead to productivity loss and lowered product quality.

A large-sized seed may be prepared by micro-suspension polymerization of monomer droplets obtained by homogenizing a mixture of a vinyl chloride monomer, an emulsifier, and an oil-soluble polymerization initiator using a pressure homogenizer or a centrifugal rotor-stator type homogenization pump. The particle size of a large-sized vinyl chloride seed is significantly affected by a factor such as the amount of an emulsifier, the number of rotation and operation time of a homogenizer, the speed (rpm) of an agitator, and a total solid content (TSC).

Generally, the average particle size of a large-sized seed is controlled by adjusting the amount of an emulsifier. However, when a large-sized seed with an increased particle size prepared through the use of a decreased amount of an emulsifier is subjected to seed emulsion polymerization, more scales may be undesirably produced.

SUMMARY OF THE INVENTION

The present invention provides a method of preparing a large-sized vinyl chloride seed exhibiting good polymerization stability suitable for seed emulsion polymerization for the production of a vinyl chloride resin, through adjustment of the operation time of a homogenizer.

The present invention also provides a large-sized seed with an average particle size above 0.54 μm, which can be used in preparation of a vinyl chloride resin with an average particle size of 0.8 to 3 μm, without increase of generation of vinyl chloride-based scales, thus ensuring improved viscosity of a plastisol.

The present invention also provides a paste vinyl chloride resin which can be used in preparation of a low-viscosity paste resin plastisol for floor coverings, and enables easy coating and pumping operations and reduction of the amount of a volatile liquid material to be combined with the plastisol.

According to an aspect of the present invention, there is provided a method of preparing a large-sized vinyl chloride seed, the method including: adding a vinyl chloride monomer, an emulsifier, and a polymerization initiator to an aqueous medium; homogenizing the mixed solution using a homogenizer for a predetermined time to obtain monomer droplets; and polymerizing the monomer droplets.

The homogenization of the mixed solution may be performed for one to three hours.

The homogenizer may be a rotor-stator type homogenizer.

According to another aspect of the present invention, there is provided a large-sized vinyl chloride seed prepared by the above-described method.

According to another aspect of the present invention, there is provided a vinyl chloride resin prepared by seed emulsion polymerization using a large-sized vinyl chloride seed having an average particle size of 0.65 to 1.5 μm and a small-sized vinyl chloride seed having an average particle size of 0.08 to 0.2 μm.

The large-sized vinyl chloride seed and the small-sized vinyl chloride seed may be used in a weight ratio ranging from 0.5 to 2.5.

The large-sized vinyl chloride seed may be prepared by micro-suspension polymerization.

The polymerization initiator used in the preparation of the large-sized vinyl chloride seed may be selected from the group consisting of peroxy dicarbonates, peroxy esters, and azo initiators.

The large-sized vinyl chloride seed may be used in an amount of 1.0 to 10.0 parts by weight based on 100 parts by weight of the vinyl chloride monomer.

The vinyl chloride resin may have an average particle size of 0.8 to 3.0 μm.

According to a further aspect of the present invention, there is provided a method of preparing a vinyl chloride resin, the method including: subjecting a large-sized vinyl chloride seed having an average particle size of 0.65 to 1.5 μm, a small-sized vinyl chloride seed having an average particle size of 0.08 to 0.2 μm, a vinyl chloride monomer, an emulsifier, and an oil-soluble initiator to seed emulsion polymerization.

The emulsifier may be selected from the group consisting of an anionic emulsifier, a nonionic emulsifier, and a combination thereof.

The anionic emulsifier may be selected from the group consisting of a carboxylic acid, an alkyl sulfonic acid, an alkyl benzene sulfonic acid, a sulfosuccinic acid, an α-olefin sulfonic acid, an alkyl phosphoric acid, and a combination thereof.

The nonionic emulsifier may be selected from the group consisting of polyoxyethylene ether, polyoxyethylene alkyl phenyl ether, polyoxyethylene alkenyl ether, a polyoxyethylene derivative, a glycerin fatty acid ester, a sorbitan fatty acid ester, a polyoxyethylene fatty acid ester, a silicone-based emulsifier, polyethylene glycol or a derivative thereof, polypropylene glycol or a derivative thereof, and a combination thereof.

DETAILED DESCRIPTION OF THE INVENTION

The present invention provides a large-sized vinyl chloride seed with good polymerization stability and an average particle size of 0.65 to 1.5 µm, prepared by a method including: adding a vinyl chloride monomer, an emulsifier, and a polymerization initiator to an aqueous medium; homogenizing the mixed solution using a homogenizer (e.g., a homogenization pump) to obtain monomer droplets; and polymerizing the monomer droplets.

The present invention is characterized in that an average particle size of a large-sized vinyl chloride seed is controlled by adjusting the operation time of a homogenizer (i.e., a homogenization time).

The large-sized vinyl chloride seed may be prepared by micro-suspension polymerization. That is, the large-sized vinyl chloride seed may be produced by adding a vinyl chloride monomer, an emulsifier, and a polymerization initiator to an aqueous medium, homogenizing the mixed solution using a homogenizer (e.g., a homogenization pump) to obtain monomer droplets, and polymerizing the monomer droplets.

The polymerization initiator as used herein is an oil-soluble polymerization initiator, and may be selected from organic peroxide initiators such as peroxy dicarbonates (e.g., diisopropyl peroxy dicarbonate) or peroxy esters (e.g., t-butyl peroxy pivalate, t-butyl peroxy neodecanoate); azo initiators (e.g., 2,2-azobisisobutyronitrile); and combinations thereof. The polymerization initiator may be generally used in an amount of 1 to 2 parts by weight based on 100 parts by weight of the vinyl chloride monomer. The content of the polymerization initiator maybe changed according to the usage of large-sized vinyl chloride seed, the reaction time depending on the heat control capability of a reactor, the particle size distribution of final particles, etc. The use of the polymerization initiator of the above-described content range guarantees stable polymerization.

In the preparation of the large-sized vinyl chloride seed, the emulsifier may be used together with an auxiliary dispersant for stabilizing a polymerization reaction and the seed. For example, the auxiliary dispersant may be selected from higher alcohols such as lauryl alcohol, myristyl alcohol, or stearyl alcohol; higher fatty acids such as lauric acid, myristic acid, palmitic acid, or stearic acid; etc.

The above-described components are added to an aqueous medium, the mixed solution is homogenized with a rotor-stator type homogenizer (e.g., a pump), and the resultant monomer droplets are polymerized to produce a large-sized vinyl chloride seed.

The operation time of the homogenizer (i.e., a homogenization time) is reduced by 40 to 60%, as compared to a conventional preparation method of a large-sized vinyl chloride seed, in order to increase the average particle size of the inventive large-sized vinyl chloride seed.

The homogenization time may be changed depending on a reaction scale, but may generally range from one to three hours, as compared with a homogenization time (i.e., four hours (on average)) required for the preparation of a currently available vinyl chloride seed.

The large-sized vinyl chloride seed prepared by the above-described method may have an average particle size of 0.65 to 1.5 µm.

When the large-sized vinyl chloride seed is subjected to seed emulsion polymerization, it is possible to produce a paste vinyl chloride resin with good polymerization stability and an average particle size of 0.8 to 3.0 µm, with slight or no generation of scales.

The present invention also provides a method of preparing a vinyl chloride resin with improved low-viscosity properties, and a vinyl chloride resin prepared by the method. The vinyl chloride resin may be produced by seed emulsion polymerization of a vinyl chloride monomer, the above-prepared large-sized vinyl chloride seed, and a small-sized vinyl chloride seed in an aqueous medium in the presence of an emulsifier, a buffer, a redox catalyst, etc. The vinyl chloride resin exhibits lowered high-shear and low-shear viscosity properties through the use of the large-sized vinyl chloride seed with a larger particle size than a large-sized seed commonly used in the art, and adjustment of the weight ratio of the large-sized vinyl chloride seed and the small-sized vinyl chloride seed.

In the preparation of the inventive vinyl chloride resin, a large-sized vinyl chloride seed with an average particle size of 0.65 to 1.5 µm and a small-sized vinyl chloride seed with an average particle size of 0.08 to 0.2 µm are used in a predetermined weight ratio. The particle size distribution of final particles may be controlled by adjusting the weight ratio of the large- and small-sized seeds. Generally, the content of each of the two kinds of the seeds may be 1.0 to 10.0 parts by weight based on 100 parts by weight of the monomer, and the weight ratio of the large-sized seed to the small-sized seed may range from 0.5 to 2.5. If the weight ratio of the large-sized seed to the small-sized seed is less than 0.5, a low-shear viscosity increase may undesirably occur markedly. On the other hand, if the weight ratio of the large-sized seed to the small-sized seed exceeds 2.5, a high-shear viscosity increase (dilatancy) may undesirably occur markedly.

The vinyl chloride resin produced by the inventive resin preparation method exhibits a bimodal particle size distribution and a high-shear and low-shear viscosity drop. Generally, when performing a polymerization reaction using two kinds of seed particles, i.e., large-sized seed particles and small-sized seed particles (e.g., 0.1 µm particle size), the small-sized seed particles can increase a low-shear viscosity, and at the same time, decrease a high-shear viscosity. In this regard, an appropriate adjustment of the weight ratio of the large- and small-sized seeds is an essential process for the inventive resin preparation method.

According to the above-described inventive resin preparation method, it is possible to produce a vinyl chloride resin having a general particle size of 0.1 to 4 µm, an average particle size of 0.8 to 3.0 µm, and a preferable particle size of 0.8 to 1.5 µm.

As such, the inventive vinyl chloride resin prepared using a large-sized vinyl chloride seed having a larger particle size than a 0.5 µm particle size of a currently available large-sized seed can be formed into a plastisol with a lower viscosity, thus enabling the reduced use of a liquid material during plastisol processing, the production of highly rigid products, and improved working operations.

With respect to the vinyl chloride monomer used in the preparation of the paste vinyl chloride resin, 80 to 98 wt % of the monomer is generally converted into the paste vinyl chloride resin, and an unreacted residual monomer is removed. The paste vinyl chloride resin is prepared by spray-drying a vinyl chloride resin latex obtained after polymerization. During the drying, dehydration, filtration etc. are not generally performed, and thus, components such as an emulsifier are left in the resin.

The emulsifier used in the preparation of the resin may be an anionic emulsifier, a nonionic emulsifier, or a combination thereof.

The anionic emulsifier may be a carboxylic acid, an alkyl sulfonic acid, an alkyl benzene sulfonic acid, a sulfosuccinic acid, an α-olefin sulfonic acid, an alkyl phosphoric acid, etc. The anionic emulsifier may be used in an amount of 0.5 to 1.5 parts by weight based on 100 parts by weight of the vinyl chloride monomer. The use of the anionic emulsifier of the above content range ensures improved polymerization stability and mechanical stability of the resin.

The nonionic emulsifier may be polyoxyethylene ether, polyoxyethylene alkyl phenyl ether, polyoxyethylene alkenyl ether, a polyoxyethylene derivative, a glycerin fatty acid ester, sorbitan fatty acid ester, polyoxyethylene fatty acid ester, a silicone-based emulsifier, polyethylene glycol or its derivative, polypropylene glycol or its derivative, or the like. The content of the nonionic emulsifier is not particularly limited, and may be up to 3 parts by weight based on 100 parts by weight of the vinyl chloride monomer.

The emulsifier may be added to the aqueous medium at a time before the seed emulsion polymerization or consecutively during the polymerization. Alternatively, the emulsifier may also be added to a resin latex at a time after the polymerization. If necessary, the above-described addition methods may be combined.

It is preferable to add the emulsifier consecutively during the polymerization, taking into consideration that the addition of the emulsifier before the polymerization may cause a side reaction generating small particles.

Hereinafter, the present invention will be described more specifically by Examples. However, the following Examples are provided only for illustrations and thus it would be appreciated by those skilled in the art that various modifications and changes may be made without departing from the principles and spirit of the invention and fall under the inventive scope which is defined in the attached claims.

EXAMPLE 1

(1-1) Preparation of a Large-sized Vinyl Chloride Seed Latex Through Micro-suspension Polymerization 97 kg of deionized water, 89 g of $KH_2PO_4$, 11 g of NaOH (98%), 1.2 kg of lauryl peroxide, and 0.9 g of paraquinone were introduced to a 200 l high-pressure reactor while stirring at a speed of 40 rpm using an agitator, and vacuum of −730 mmHg was applied thereto to keep the reactor at a vacuum state. Then, 66 kg of a vinyl chloride monomer and 7.8 kg of sodium dodecylbenzene sulfonate (15%) were introduced into the reactor, and the reactor was stirred for 15 minutes. An internal temperature of the reactor was reduced to less than 20° C., and the introduced components were homogenized using a rotor-stator type homogenizer for two hours. After the homogenization was completed, the reactor was heated to 43° C. to initiate polymerization. When the pressure of the reactor reached 3.5 kg/cm², the polymerization reaction was terminated and an unreacted residual monomer was recovered and removed, to give a large-sized vinyl chloride seed latex (an average particle size: 0.77 μm, TSC (total solid content): 35%, and the content of lauryl peroxide used as an oil-soluble initiator: 1.77%).

(1-2) Preparation of a Vinyl Chloride Resin Latex Through Seed Emulsion Polymerization 46 kg of deionized water, 77 kg of a vinyl chloride monomer, and 4.3 kg of sodium dodecylbenzene sulfonate (15%) were introduced into a 200 l high-pressure reactor. The reactor was heated to 51.5° C., and seed emulsion polymerization was performed at the same temperature for seven hours to obtain a vinyl chloride resin latex. At this time, 9 kg of the large-sized vinyl chloride seed latex prepared in (1-1) of Example 1, and 4.5 kg of a small-sized vinyl chloride seed (an average particle size: 0.1 μm, TSC: 40%) were used. When the pressure of the reactor reached 4 kg/cm², the polymerization reaction was terminated and an unreacted residual monomer was recovered and removed to give a vinyl chloride resin latex (an average particle size: 0.94 μm, TSC: 50%, the content of scales: less than 100 g) for floor covering applications.

COMPARATIVE EXAMPLE 1

The same procedure as in (1-1) of Example 1 was repeated except that homogenization was performed for four hours using a rotor-stator type homogenizer to give a large-sized vinyl chloride seed latex (an average particle size: 0.54 μm, TSC: 35%, the content of lauryl peroxide used as an oil-soluble initiator: 1.77%).

A vinyl chloride resin latex (an average particle size: 0.73 μm, TSC: 50%, the content of scales: less than 100 g) for floor covering applications was obtained by seed emulsion polymerization using the above-prepared large-sized vinyl chloride seed latex.

COMPARATIVE EXAMPLE 2

The same procedure as in (1-1) of Example 1 was repeated except that homogenization was performed for four hours using a rotor-stator type homogenizer and 5.6 kg of sodium dodecylbenzene sulfonate (15%) was used to obtain a large-sized vinyl chloride seed latex (an average particle size: 0.75 μm, TSC: 35%, the content of lauryl peroxide used as an oil-soluble initiator: 1.77%).

A vinyl chloride resin latex (an average particle size: 0.91 μm, TSC: 50%, the content of scales:more than 1,000 g) for floor covering applications was obtained by seed emulsion polymerization using the above-prepared large-sized vinyl chloride seed latex.

COMPARATIVE EXAMPLE 3

The same procedure as in (1-1) of Example 1 was repeated except that homogenization was performed for four hours using a rotor-stator type homogenizer and 3.5 kg of sodium dodecylbenzene sulfonate (15%) was used to obtain a large-sized vinyl chloride seed latex (an average particle size: 1.05 μm, TSC: 35%, the content of lauryl peroxide used as an oil-soluble initiator: 1.77%).

During the preparation of a vinyl chloride resin latex using the above-prepared large-sized seed latex, vinyl chloride resin latex particles were agglomerated (a scaling phenomenon) due to lowered stability of the large-sized seed latex.

TABLE 1

| Section | | Example 1 | Comparative Example 1 | Comparative Example 2 | Comparative Example 3 |
|---|---|---|---|---|---|
| Large-sized seed | Amount of emulsifier (kg) | 7.8 | 7.8 | 5.6 | 3.5 |
| | Homogenization time (hrs) | 2 | 4 | 4 | 4 |
| | Average particle size (μm) | 0.77 | 0.54 | 0.75 | 1.05 |
| Vinyl chloride resin | Latex state | Normal | Normal | Normal | Abnormal (agglomerate) |
| | Average particle size (μm) | 0.94 | 0.73 | 0.91 | Not measured |
| | Content of scales (g) | <100 | <100 | >1,000 | Excess |

*average particle size was measured using a UPA150 particle-size analyzer (Microtrac).

As compared with Comparative Example 1, the average particle sizes of the seed and resin latexes of Example 1 were increased due to a reduced homogenization time. As such, the average particle sizes of the inventive seed and resin latexes were increased, but an increase of scales did not occur.

In connection with Comparative Examples 2 and 3 in which a smaller amount of an emulsifier was used as compared with Example 1, the average particle sizes of the seed and resin latexes were increased, but more scales were generated.

EXAMPLE 2

60 kg of deionized water, 80 kg of a vinyl chloride monomer, and 0.46 kg of sodium dodecylbenzene sulfonate were introduced into a 200 l high-pressure reactor. The reactor was heated to 50.5° C., and seed emulsion polymerization was performed for seven hours to obtain a vinyl chloride resin latex. At this time, a large-sized vinyl chloride seed latex (an average particle size: 0.77 μm, the content of a polymerization initiator: 1.77%) and a small-sized vinyl chloride seed latex (an average particle size: 0.1 μm) were used, and the weight ratio of the large-sized seed latex to the small-sized seed latex was 1.09.

EXAMPLE 3

A vinyl chloride resin latex was prepared in the same manner as in Example 2 except that the weight ratio of the large-sized seed latex to the small-sized seed latex was 0.84.

EXAMPLE 4

A vinyl chloride resin latex was prepared in the same manner as in Example 2 except for using a large-sized vinyl chloride seed latex with an average particle size of 0.71 μm.

COMPARATIVE EXAMPLE 4

A vinyl chloride resin latex was prepared in the same manner as in Example 2 except that a large-sized vinyl chloride seed latex with an average particle size of 0.5 μm was used and the weight ratio of the large-sized seed latex to the small-sized seed latex was 1.13.

COMPARATIVE EXAMPLE 5

A vinyl chloride resin latex was prepared in the same manner as in Example 2 except that a large-sized vinyl chloride seed latex with an average particle size of 0.5 μm was used and the weight ratio of the large-sized seed latex to the small-sized seed latex was 0.8.

COMPARATIVE EXAMPLE 6

A vinyl chloride resin latex was prepared in the same manner as in Example 2 except that a large-sized vinyl chloride seed latex with an average particle size of 0.5 μm was used and the weight ratio of the large-sized seed latex to the small-sized seed latex was 1.68.

COMPARATIVE EXAMPLE 7

A vinyl chloride resin latex was prepared in the same manner as in Example 2 except that the weight ratio of the large-sized seed latex to the small-sized seed latex was 5.0.

The average particle sizes and viscosities of the vinyl chloride resin latexes prepared in Examples 2-4 and Comparative Examples 4-7 were measured according to the following methods, and the results are summarized in Table 2 below.

An average particle size was measured using a UPA 150 particle-size analyzer (Microtrac).

A low-shear viscosity (Rheometer, Physica) -100 parts by weight of each of the paste vinyl chloride resin latexes prepared in Examples 2-4 and Comparative Examples 4-7, 20 parts by weight of dioctylphthalate as a primary plasticizer, 5 parts by weight of TXIB (2,2,4-trimethyl-1,3-pentanediol diisobutyrate) as a secondary plasticizer, 10 parts by weight of Di-sol80 as a viscosity reducing agent, 2.5 parts by weight of LOX804A as a stabilizer, and 3 parts by weight of ESO(Epoxy soybean oil) as an auxiliary stabilizer were mixed and stirred at a speed of 500 rpm for 10 minutes and then at a speed of 800 rpm for 10 minutes to obtain a paste sol (plastisol). The paste sol was subjected a vacuum defoaming process and incubated at 25° C. for one hour, and the low-shear viscosity of the paste sol was measured at a shear rate of 6 rpm using a LV type BF viscometer with a spindle #3.

A high-shear viscosity was measured at a shear rate of 2000/s using a cone-plate type rheometer (Physica).

TABLE 2

| Section | Example 2 | Example 3 | Example 4 | Comparative Example 4 | Comparative Example 5 | Comparative Example 6 | Comparative Example 7 |
|---|---|---|---|---|---|---|---|
| Average particle size of large-sized seed (μm) | 0.77 | 0.77 | 0.71 | 0.5 | 0.5 | 0.5 | 0.77 |
| Weight ratio of large-sized seed/small-sized seed | 1.09 | 0.84 | 1.09 | 1.13 | 0.8 | 1.68 | 5.0 |

TABLE 2-continued

| Section | Example 2 | Example 3 | Example 4 | Comparative Example 4 | Comparative Example 5 | Comparative Example 6 | Comparative Example 7 |
|---|---|---|---|---|---|---|---|
| Low-shear viscosity (Pas) | 1500 | 1900 | 1700 | 2000 | 2200 | 4400 | 2000 |
| High-shear viscosity (Pas) | 4500 | 3900 | 5200 | 9700 | 6500 | 14000 | 13000 |
| Average particle size of resin (μm) | 1.1 | 1.08 | 0.85 | 0.87 | 0.89 | 0.81 | 1.3 |

As seen from Table 2, the vinyl chloride resin latex of Example 2 exhibited a viscosity drop due to its increased average particle size, as compared with currently available vinyl chloride resins, i.e., the vinyl chloride resins of Comparative Examples 4-6.

In connection with the vinyl chloride resin latex of Example 3, due to the use of an increased amount of a small-sized seed, the low-shear viscosity of the resin latex was increased but the high-shear viscosity was decreased, as compared with the vinyl chloride resin latex of Example 2. This result suggests that it is possible to control the rheological properties of a resin to a level suitable for final applications by adjusting the weight ratio of a large-sized seed and a small-sized seed.

As is apparent from the above description, according to the inventive method of preparing a large-sized vinyl chloride seed, it is possible to produce a stable, large-sized vinyl chloride seed with an average particle size of 0.65 to 1.5 μm using a rotor-stator type homogenizer. Seed emulsion polymerization using the large-sized vinyl chloride seed enables production of a paste vinyl chloride resin with good polymerization stability, simultaneously with slight or no generation of scales.

Moreover, the particle size distribution of a paste vinyl chloride resin can be adjusted by adjusting the particle size of a large-sized seed and the weight ratio of the large-sized seed and a small-sized seed. Resin particles having a desired particle size distribution can be formed into a plastisol, which is a semi-liquid paste resin, having improved low-shear and high-shear viscosities, and such adjustment of a resin particle size distribution enables the production of resins suitable for manufacturer's operation conditions.

What is claimed is:

1. A method of preparing a vinyl chloride resin comprising:
   subjecting a large-sized vinyl chloride seed having an average particle size of 0.65 to 1.5 μm, a small-sized vinyl chloride seed having an average particle size of 0.08 to 0.2 μm, a vinyl chloride monomer, an emulsifier, and an oil-soluble initiator to a seed emulsion polymerization.

2. The method of claim 1, Wherein the weight ratio of the large-sized seed : the vinyl chloride monomer is 1.0 to 10.0:1.

3. The method of claim 1,
   wherein the emulsifier is selected from the group consisting of an anionic emulsifier, a nonionic emulsifier, and a combination thereof.

4. The method of claim 3,
   wherein the anionic emulsifier is selected from the group consisting of a carboxylic acid, an alkyl sulfonic acid, an alkyl benzene sulfonic acid, a sulfosuccinic acid, an α-olefin sulfonic acid, an alkyl phosphoric acid, and a combination thereof.

5. The method of claim 3,
   wherein the nonionic emulsifier is selected from the group consisting of polyoxyethylene ether, polyoxyethylene alkyl phenyl ether, polyoxyethylene alkenyl ether, a polyoxyethylene derivative, a glycerin fatty acid ester, a sorbitan fatty acid ester, a polyoxyethylene fatty acid ester, a silicone-based emulsifier, polyethylene glycol or a derivative thereof, polypropylene glycol or a derivative thereof, and a combination thereof.

* * * * *